F. C. OVERBURY.
MACHINE FOR MAKING SHINGLE STRIPS.
APPLICATION FILED JUNE 7, 1917.
Reissued Apr. 4, 1922. 15,328.
2 SHEETS—SHEET 1.
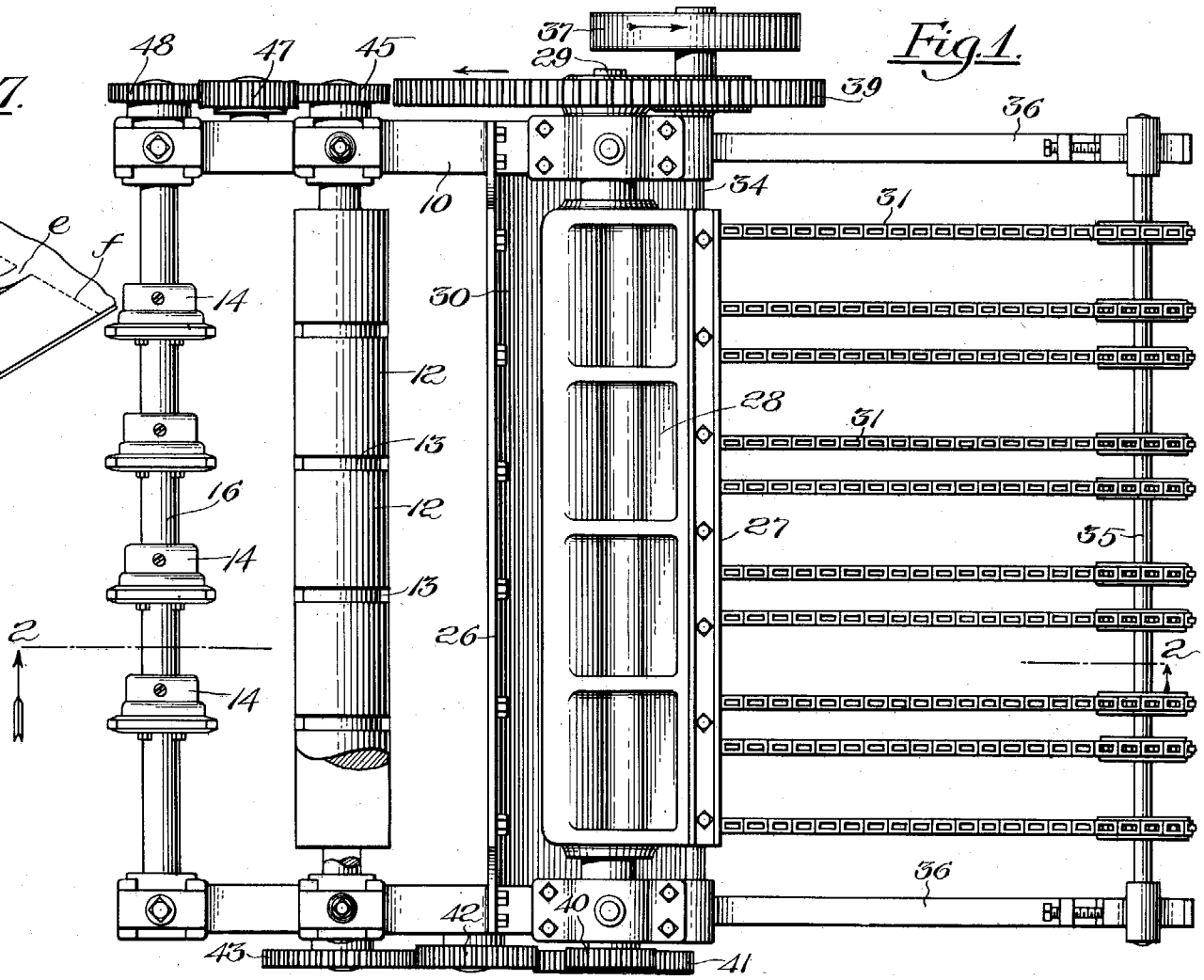
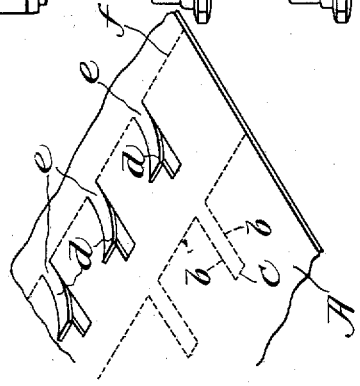
Inventor:
F. C. Overbury
by Edwards Brown Dumbrys & May
Attorneys.

F. C. OVERBURY.
MACHINE FOR MAKING SHINGLE STRIPS.
APPLICATION FILED JUNE 7, 1917.
Reissued Apr. 4, 1922. 15,328.
2 SHEETS—SHEET 2.
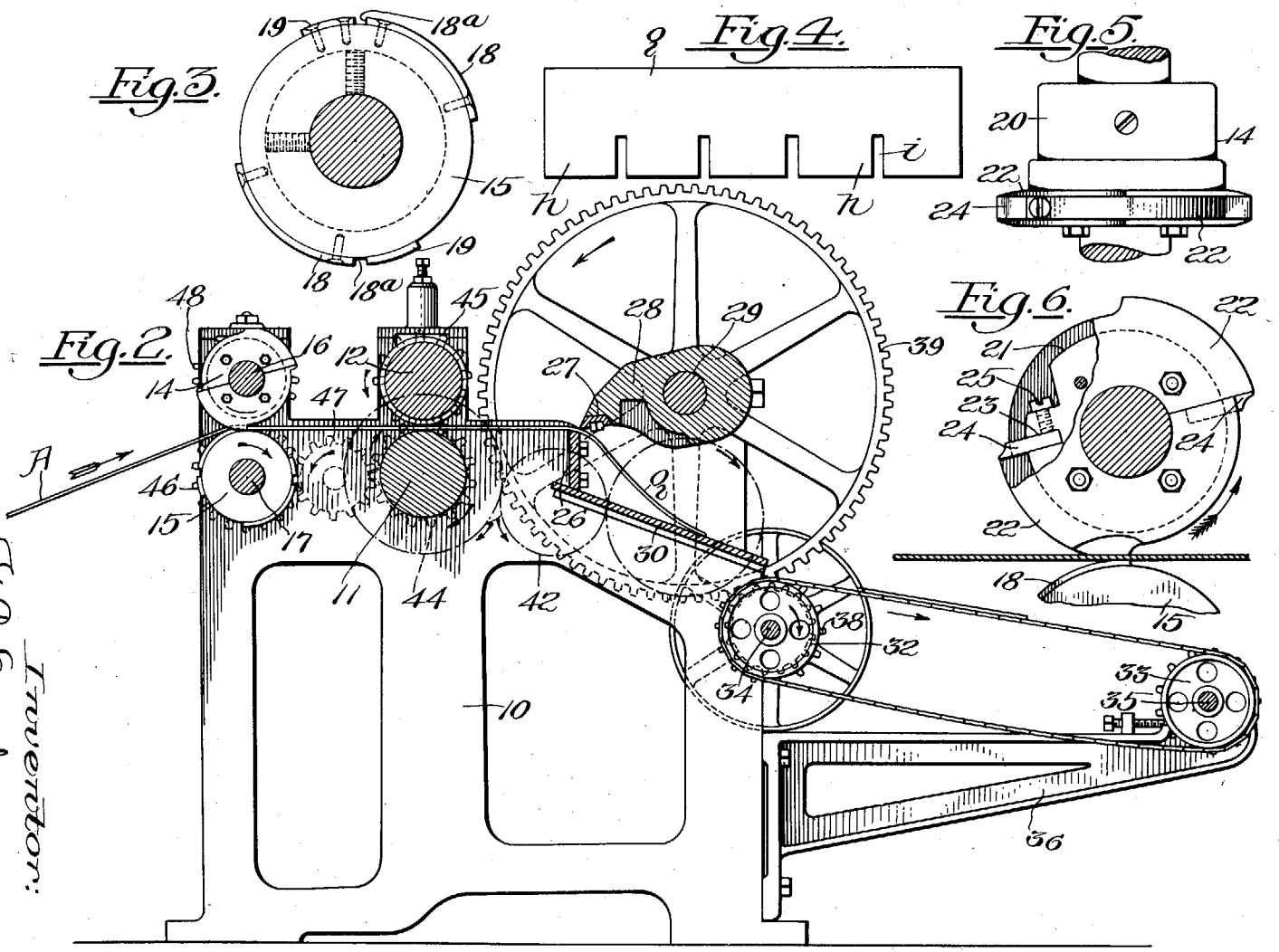
Inventor:
F. C. Overbury
by Albright Brown Grimley & Mary
Attorneys.

UNITED STATES PATENT OFFICE.

FREDERICK C. OVERBURY, OF HILLSDALE, NEW JERSEY, ASSIGNOR, BY MESNE ASSIGNMENTS, TO THE FLINTKOTE COMPANY, OF BOSTON, MASSACHUSETTS, A CORPORATION OF MASSACHUSETTS.

MACHINE FOR MAKING SHINGLE STRIPS.

15,328. Specification of Reissued Letters Patent. Reissued Apr. 4, 1922.

Original No. 1,182,416, dated May 9, 1916, Serial No. 45,205, filed August 12, 1915. Application for reissue filed June 7, 1917. Serial No. 173,367.

*To all whom it may concern:*

Be it known that I, FREDERICK C. OVERBURY, a citizen of the United States, and a resident of Hillsdale, in the county of Bergen and State of New Jersey, have invented certain new and useful Improvements in Machines for Making Shingle Strips, of which the following is a specification.

This invention has for its object to provide a machine which may be used in the manufacture of shingle strips which may be used for covering roofs, side walls and the like.

As set forth in Letters Patent No. 1,150,298, granted to me on the 17th day of August, 1915, shingle strips are formed of what is known as prepared roofing material; that is to say, a sheet or foundation of felt or equivalent fibrous material saturated or impregnated with a relatively low-melting-point pitch, asphalt or other hydrocarbon and coated on one or both faces with pitch or asphalt, the melting point of which is high enough to prevent injurious action thereon by solar heat. This pitch or asphalt coating may have incorporated therein a suitable pigment for imparting the desired color to the surface of the material, or there may be embedded in the outer coating, while the latter is in a soft and plastic condition, a layer of grit or crushed mineral material of any desired color. This roofing material is originally formed in elongated sheet form and is cut transversely of the sheet into relatively narrow strips of the same length.

The object of the present invention particularly, therefore, is to provide a machine for severing the sheet roofing material into shingle strips, and for forming on that portion of the strip, which is to be exposed when laid in overlapping relation to others, tabs or projections of predetermined shape or configuration, which, when the shingle strips are laid, simulate tiles or shingles.

On the accompanying drawings,—

Figure 1 represents in plan view a machine embodying the invention.

Figure 2 represents a longitudinal section through the same on the line 2—2 of Figure 1.

Figure 3 represents one of the cutters.

Figure 4 illustrates a shingle strip such as formed by the machine.

Figures 5 and 6 represent another of the cutters which are provided with slitting blades and cross-cutting blades.

Figure 7 represents a portion of the sheet of roofing and shows the formation of tongues therein by the slitting cutters.

The invention contemplates the combination of mechanism for feeding the elongated sheet longitudinally, cutters for forming longitudinal slots arranged in rows across the sheet, and means for severing the sheet in a line intersecting the slots of each transverse row. It will be quite evident that these several elements or instrumentalities may take different forms and be arranged in different ways without departing from the spirit and scope of the invention.

In the embodiment of the machine as shown, the cutters for forming the rows of slots are so arranged and formed as to cut into the sheet pairs of longitudinal slits of the same length connected at their rear ends by cross slits so as to leave tongues attached at one end of the body of the sheet. Preferably the draw rolls or feeding rolls are peripherally grooved so that the tongues which are forced out of the plane of the sheet by the action of the cutters are not pressed back into the slots caused by their formation. After leaving the feeding rolls, the sheet is severed transversely by a chopping knife operating against the shear block, the line of the cut extending across the attached ends of the tongues so as to completely detach them from the sheet and from the shingle strip which is completed by the severing cut. The severed shingle strips, as they are cut successively from the sheet, are received by open carriers which feed them away from the machine and permit the detached tongues to pass therethrough and not become commingled with the finished product. Preferably the feeding of the sheet is continuous, the parts being so timed that the sheet is fed a predetermined distance before it is severed transversely into sections by the chopping knife.

Referring to the drawings, the machine there shown is provided with a frame-work of any suitable character, and may comprise side standards 10 connected by any suitable cross braces not shown. The feed rolls are indicated at 11 and 12, and they are journaled in suitable bearings in the frame-work. The lower feed roll 11 may consist of an unbroken cylinder, whereas the feed roll 12 is preferably formed with peripheral grooves 13 adapted to register with tongues that are formed in the roofing sheet. The feed roll 12 is mounted in yielding bearings of any suitable character, but, as such bearings are well known, I have not shown them in detail. Power is transmitted to these feed rolls by a train of gears which I shall subsequently explain.

The sheet of roofing A is drawn either from a roll or it may be drawn directly from the machines in which it is saturated, coated and surfaced with crushed mineral. As it enters the machine embodying the present invention, it passes between coacting cutters which are indicated as a whole at 14 and 15. The cutters 14 are adjustably secured upon a shaft 16, whereas the cutters 15 are adjustably secured upon a shaft 17, both shafts being journaled in suitable bearings in the frame-work. Each cutter 15 consists of a disk of the desired width, having on its periphery the two shear blocks 18 and 19. The side edges of the block 18 are in shearing relation with the slitting blades forming a part of the cutter 14, whereas the end edge 18[a] of the block 18, and the block 19 cooperate with a cross blade forming a part of the same cutter 14. These shear blocks 18 and 19 are secured upon the cutter 15 by any suitable fastenings. Each cutter 14 comprises a hub 20 formed at the end with a peripheral flange 21. To each face of the flange are secured two segmental slitting blades 22 which are adapted to cooperate with the shear blocks 18 of the coacting cutter 15. The flange 21 is provided with sockets 23 to receive the cross-cutting blades 24, the chisel edges of which cooperate with the end edges 18[a] of the shear blocks 18. The blades 24 are secured in their sockets by screws or other fastenings 25, the flange 21 being recessed to receive the same as shown in Figure 6. Each cutter, as thus described, is provided with two sets of knives or two sets of shear blocks as the case may be, so that, during one complete revolution of the coacting cutters, two sets of slits will be formed in the sheet. The blades 22 and their cooperating shear block 18 will cause the formation of parallel slits *b b* as shown in Figure 7, the rear ends of these slits to be connected by a cross slit *c* formed by the blade 24 and its cooperating shear block 18. This causes the formation of tongues *d* which are forced upwardly by the shear blocks from the plane of the sheet and which are attached at their front ends *e* to the body of the sheet. As the sheet passes between the rollers, the tongues *d* are received by the grooves 13 of the feed roll 12 and are not forced back into the plane of the sheet so as to stick or adhere to the walls of the slot. The material, which is employed for impregnating the sheet, is more or less sticky and adhesive, and, when the tongues are forced back into the sheet, they stick in the slots and are difficult to remove; whereas, by forcing them out of the slots, they do not adhere when the sheet is subsequently transversely severed. After leaving the feed rolls, the sheet A passes over a shear block or bed 26 with which cooperates a chopping blade 27 secured on a rotatable cutter 28. The latter is relatively heavy and solid so as to insure a severing cut which will be clean and not ragged. This cutter 28 is secured upon a shaft 29 journaled in bearings in the frame-work. The parts are so timed that the cutter 28 severs the sheet on a line *f* (see Figure 7) which intersects the ends of the slits *b* so as to cause the severance of the tongues *d* at their attached ends. As a result, each severed portion of the sheet constitutes a shingle strip, such as shown in Figure 4 at *g* and having a plurality of tabs or projections *h* separated by recesses *i*. These tabs or projections can be formed of different widths, according to the adjustment of the cutters 14 and 15 on their respective shafts 16 and 17, and I employ interchangeable feed rolls 12 having grooves corresponding to the width of the recesses so as to receive the tongues as previously explained.

Below the shear block there is an inclined plate 30 on which the severed portions of the sheet or the shingle strips slide until they are received by the open endless carriers 31. These carriers consist of chains or other suitable endless belts mounted upon sprockets 32, 33, or equivalent devices. The sprockets 32 are upon a shaft 34 journaled in the frame-work, whereas the sprockets 33 are on a shaft 35 journaled in bearings upon the ends of brackets 36 secured to the frame-work. As the finished shingle strips are being carried away in the direction of the arrow in Figure 2, the severed tongues drop between the several carriers and accumulate in a pile without becoming mixed or intermingled with the finished shingle strip.

It is quite evident that the draw or feed rolls, the slitting cutters and the chopping mechanism may be all operated in proper timed relation by any suitable power-transmitting mechanism. As illustrating conventionally a suitable means for accomplishing this purpose, I have shown the machine as being provided with a driving pulley 37 on the shaft 34. This last-mentioned shaft has a gear 38 intermeshing with and driving a large gear 39 on the shaft 29. On the other end of the shaft there is a pinion 40 engaging a gear 41 journaled on the stud shaft and intermeshing with an idler gear 42 likewise mounted on the stud shaft and all on the front side of the machine. The last-mentioned idler gear 42 intermeshes with and drives a gear 43 secured on the end of the lower feed roll 11. On the rear end of the last-mentioned roll and on the like end of the roll 12 are intermeshing gears 44, 45, to cause the two feed rolls to be driven in unison. From the gear 44 power is transmitted to a gear 46 on the knife shaft 17 by an intermediate idler gear 47. The gear 46 intermeshes with the gear 48 formed on the knife shaft 16. In lieu of the train of gearing which I have just described, any other suitable power-transmitting mechanism may be utilized.

A sheet of roofing having been prepared as herein described, on being fed through the machine, has formed therein the longitudinal pairs of slits, the slits of each pair being connected by the cross slits and thus forming attached tongues. Thereafter the sheet is severed to provide a series of shingle strips.

The invention, as herein described, and embodied in a suitable machine, is capable of producing shingle strips in large quantities and at very small cost. The sheet, during its travel through the machine, may be guided by any suitable guides, but I have not shown them as they constitute an obvious mechanical expedient.

It is evident that the longitudinal slits of each pair of slits need not necessarily be straight or parallel, and that cutters of other forms may be substituted therefor to produce tabs or projections of different shapes and in simulation of ornamental tiles or shingles. So far as any common generic inventions or improvements as herein claimed are concerned, this is a continuation in part of my previous application Serial No. 23,153, filed April 22, 1915.

Having thus explained the nature of my said invention, and described a way of making and using the same, although without attempting to set forth all of the forms in which it may be made or all of the modes of its use, what I claim is:

1. A machine for making shingle strips, comprising coacting feed rolls for longitudinally feeding an elongated sheet of roofing felt, cutters on one side of said feed rolls having co-acting edges for forming transverse rows of longitudinal tongues in said sheet, and a chopping cutter on the other side of the feed rolls for transversely severing said sheet on a line intersecting the bases of said tongues.

2. A machine for making shingle strips, comprising means for longitudinally feeding an elongated sheet of roofing felt, cutters having co-acting edges for forming a series of transverse rows of longitudinal tongues therein, and means for simultaneously severing the end of the sheet and the ends of the tongues on a transverse line intersecting the bases of said tongues.

3. A machine for making shingle strips, comprising draw rolls for longitudinally feeding an elongated sheet of roofing felt, coacting cutters for forming a series of transverse rows of pairs of longitudinal slits in said sheet, transverse coacting blades and shear blocks for forming transverse cuts to connect the rear ends of the longitudinal slits of each pair, and means for severing the end of the sheet on the transverse line intersecting the forward ends of said longitudinal slits, whereby said sheet is formed into shingle strips each having a plurality of shingle-like tile-like tabs or projections along one edge.

4. A machine for making shingle strips, comprising coacting cutters having longitudinal and transverse slitting blades and complemental shear blocks, for forming slots in the sheet and corresponding raised tongues attached at their front ends to the body of the sheet, feed rolls formed to feed the sheet without returning said tongues to the plane of the sheet, and a chopping cutter for severing said sheet on a line intersecting the bases of the tongues.

5. A machine for making shingle strips, comprising coacting cutters arranged respectively above and below the plane of travel of a sheet of roofing felt, and constructed to form transverse rows of longitudinal tongues each attached at one end to the sheet, a chopping cutter arranged to sever the strip transversely on lines intersecting the bases of the tongues, means located between said coacting cutters and said chopping cutter for feeding the sheet and an open conveyer mechanism for carrying away the finished strips from the severed tongues.

6. A machine for making shingle strips, comprising means for longitudinally feeding a sheet of prepared roofing felt, coacting cutters above and below the plane of travel of said sheet for forming transverse rows of pairs of longitudinal slits in said sheet, coacting transverse blades and shear blocks above and below the said plane for forming transverse slits intersecting the pairs of longitudinal slits, and means for severing said sheet transversely on lines intersecting said longitudinal slits.

7. A machine for making shingle strips, comprising cutting mechanism, consisting of rotary shear block cutters and coacting rotary shear knife cutters, arranged to cut pairs of longitudinal slits and connecting transverse slits in said sheet to form transverse rows of slots, and means for severing said sheet transversely in lines intersecting said longitudinal slits.

8. A machine for making roofing shingle strips, comprising a pair of feeding rolls of which one is provided with spaced peripheral grooves, coacting cutters for forming tongues in the body of a sheet of roofing felt, said cutters and said grooves being arranged in the same longitudinal vertical planes, a chopping cutter for transversely severing said sheet on lines registering with the bases of the tongues, and an open conveyor for separating the finished shingles from the severed tongues.

In testimony whereof I have affixed my signature.

FREDERICK C. OVERBURY.